March 18, 1941.  E. A. LARSSON  2,235,618
CAR COUPLER
Original Filed April 7, 1939  2 Sheets-Sheet 1
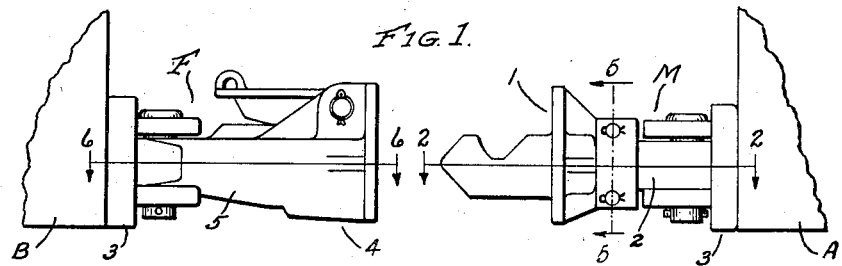
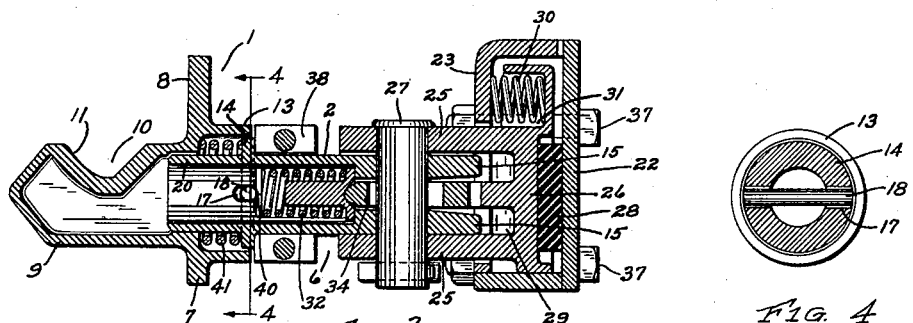
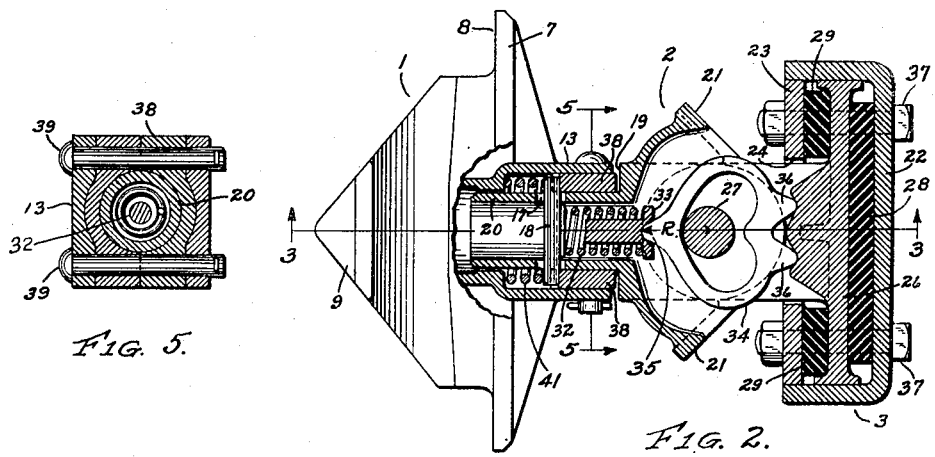
Inventor
ERNST A. LARSSON
By
Attorney March 18, 1941.  E. A. LARSSON  2,235,618

CAR COUPLER

Original Filed April 7, 1939   2 Sheets-Sheet 2

Inventor
ERNST A. LARSSON
Attorney

Patented Mar. 18, 1941

2,235,618

UNITED STATES PATENT OFFICE 2,235,618

CAR COUPLER

Ernst A. Larsson, Mansfield, Ohio, assignor to The Ohio Brass Company, Mansfield, Ohio, a corporation of New Jersey Original application April 7, 1939, Serial No. 266,591. Divided and this application July 2, 1940, Serial No. 343,592

8 Claims. (Cl. 213—62)

My invention relates to car couplers and particularly couplers of the automatic type suitable for use in industrial and mine operations.

This application is a division of my copending case Serial Number 266,591, filed April 7, 1939.

One object of my invention is to provide a coupler having means to permit one or more cars of a train consisting of a plurality of coupled cars, to be rotated about the longitudinal axis of the coupler in order to dump the same without disturbing the other cars in the train.

My invention resides in the new and novel construction, combination and relation of the parts herein described and shown in the drawings accompanying this specification.

In the drawings—

Fig. 1 represents two car bodies A and B with two couplers, one on each car, in position to be coupled, the right-hand coupler M being of the male type and the left-hand coupler F being of the female type.

Fig. 2 is a view in partial section taken on the line 2—2 of the coupler M in Fig. 1.

Fig. 3 is a view in partial section taken on the line 3—3 of Fig. 2.

Fig. 4 is a view in partial section taken on the line 4—4 of Fig. 3.

Fig. 5 is a view in partial section taken on the line 5—5 of Fig. 1 or 5—5 of Fig. 2.

Figure 7:
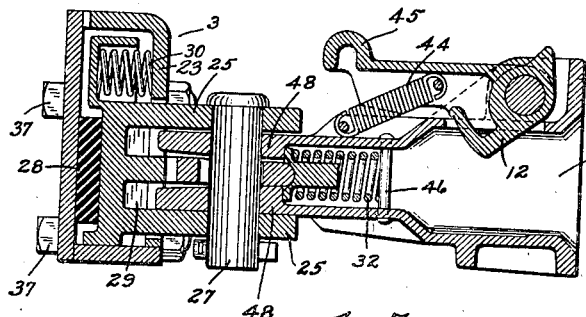
Fig. 7 is a view in partial section taken on the line 7—7 of Fig. 6.

The preferred embodiment of my invention comprises couplers of the type shown in Tomlinson Patent 1,609,444 which is of the automatic coupling type employing a male and female head. This type of coupler permits making the complete coupler quite short which is very desirable in industrial and mine haulage and also permits of coupling when the cars are on curves of short radii, that is, when the longitudinal axis of the cars to be coupled are disposed at a very considerable angle from alignment.

The male coupler M comprises in general a head 1, a draw bar 2, and a resilient anchorage 3 and in Fig. 1 these parts are shown assembled and mounted on a car body A.

The female coupler F comprises a head 4 which has integrally combined with it a draw bar 5, and the resilient anchorage 3 attached to a car body B, as shown in Fig. 1.

The male head comprises a flange 7 having a buffing face 8 and a hollow projecting tongue 9. The tongue 9 is provided with a transverse slot 10 which has a bearing face 11 for the lock or latch 12 (see Fig. 7). The head is also provided with a collar portion 13.

Figure 8:
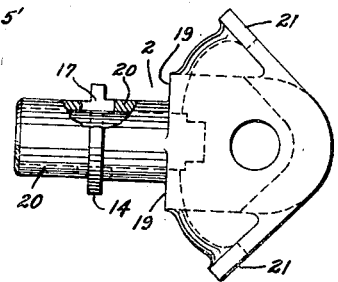
Fig. 8 is a top plan view in partial section of the draw bar used in combination with the male head.
Figure 9:
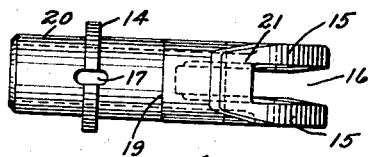
Fig. 9 is a view in side elevation of the draw bar shown in Fig. 8.

Slidably mounted in the rear end of head 1 in telescopic relation thereto is the draw bar 2 provided with a collar 14 and a clevis end which is formed of spaced portions 15 forming the slot 16 therebetween. The draw bar is provided with oppositely disposed slots 17 which cut through the flange 14 to receive a pin 18 for the purpose described. The draw bar is provided on the sides with buffing faces 19 which are omitted above and below, that is, these faces do not extend entirely around the tubular cylindrical position 20 as shown in Figs. 8 and 9 and therefore a space 6 exists on the upper and lower sides of the coupler.

The draw bar is also provided with buffing faces 21 which are arranged to engage with the resilient anchorage 3 should the coupler swing aside from its normal position in excess of a predetermined amount.

The resilient anchorage 3 is shown as comprising a back plate 22 which forms the back and vertical side walls of a receptacle. The anchorage is also provided with a front plate 23 which is shown as fitting between the side walls of the plate 22 and also forming the top and bottom sides of the anchorage receptacle. The plate 23 has an opening 24 through the front face and through which projects the spaced members 25 of the clevis member 26.

The spaced members 25 form a clevis within which is mounted the clevis end of the draw bar held in pivoted relation to the clevis member by pin 27 which extends through registering openings in the portions 15 and 25. Between the plates 22 and 23 and the clevis member 26 are positioned heavy resilient cushion members 28 and 29 arranged to take the impact and buff between the coupler and the car both in coupling and during haulage and permits the plate 23 to yield rearwardly under impact.

In order to better assist the resilient pads 28 and 29 in supporting the coupler head in a horizontal position, I employ between the upper portion of the clevis member 26 and the front plate 23 springs 30 normally under compression and preferably located in sockets 31 forming a part of clevis member 26.

The spring 30 may be replaced with resilient pads of rubber or other equivalent material the same as I employ in the pads 28 and 29 and which might be termed "car spring rubber." If desired the resilient pads 28 and 29 may be positioned in the upper end of the receptacle between the clevis member 26 and the vertical walls of the receptacle in which case the springs 30 will be mounted at the lower end of the receptacle between the clevis member 26 and the back wall 22 instead of the front wall 23.

The centering means comprises a spring 32 mounted in the wall of the cylinder 20 and butting against the pin 18. The other end of the spring 32 is provided with a pivot plate 33 which has a projection extending within the spring 32 as a guide.

Positioned in the opening 16 between the members 15 of the draw bar 2 is a centering link 34, as shown in Figs. 2 and 3.

The link 34 is provided with a pivot 35 to engage the plate 33 and also has fulcrums 36, both of which are seated against the clevis plate 26 when the coupler is in its normal position, that is, when the head is centered, as shown in Fig. 2. The head 1 and draw bar 2 may swing in unison about the axis of the pin 27 while the centering link 34 swings about the point of one of the fulcrums 36 depending upon the direction of swing.

Figure 6:
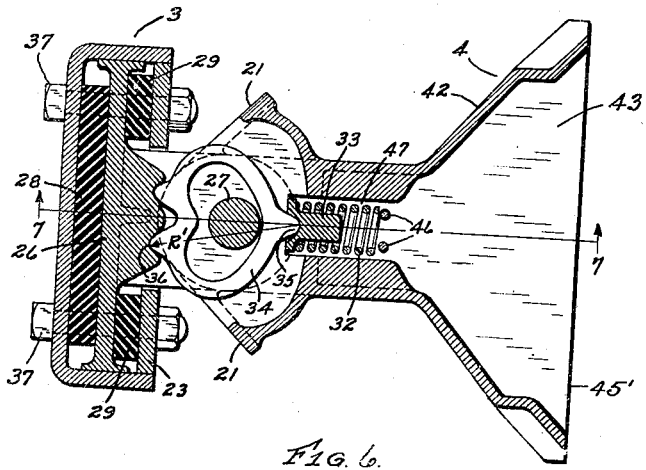
Fig. 6 is a view in partial section taken on the line 6—6 of the coupler F of Fig. 1.

The coupler as a whole will pivot about the axis of the pin 27, and in the absence of the link 34 the right-hand end of the spring 32 and pivot plate 33 would move in a uniform circular path the radius of which would be R (Fig. 2). However with the inclusion of the link 34 at the tip end of the pivot 35 will follow a uniform circular path the radius of which is R' (Fig. 6). The resultant of these two functions will cause the spring 32 to be compressed and the pivot plate 33 will be moved to the left (Fig. 2), if the coupler moves to either the right or to the left, about the axis of the pin 27. The amount of increased compression over normal upon the spring 32 will depend upon the degree of movement or swing of the coupler from its normal position.

The normal tension upon the spring 32, that is, when the coupler is in the longitudinal alignment position with respect to the axis and the car body, will be sufficient to hold the coupler in a central or normal position and any pivotal movement of the coupler from this normal position will increase the tension and cause the return of the coupler to its normal position, when uncoupled.

The parts forming the resilient anchorage are held in assembled relationship by the bolts 37, but by making the bolts somewhat longer they may be used also to secure the coupler equipment to the car bodies A and B. In Figs. 2 and 6 the bolts are shown as merely holding the parts in assembled relation.

In order to permit the cars to be rotated about their longitudinal axis relative to each other, as in the case of dumping a loaded car at a tipple, it is necessary that one of the pair of couplers rotates relative to the other about its longitudinal axis and to secure this relative rotation I employ a special construction with respect to the male coupler although the same construction can be applied to the female coupler.

Referring to Figs. 2 and 3, I provide the slot 17 in which is positioned the pin 18. Surrounding the cylindrical portion 20 of the draw bar is a split collar composed of like parts 38 which are mounted within the sleeve 13 which is an integral part of the head 1 which is held in place by means of the pins 39. The collar 38 substantially fills the space between the end face 19 of the draw bar and the flange 14 and is rotatable with the head since the pins 39 lock the collar 38 and part 13 against rotation.

The face of each member 38 adjacent the pin 18 is provided with a notch 40, preferably V shaped, in which the pin rests when the coupler heads are in their normal position, that is, in an aligned position to be coupled. To maintain the pin 18 in the notch 40, a spring 41 is employed which butts against the pin 18 and which tends to move the head 1 and the sleeve 38 outwardly, but moves the pin inwardly because the collar 38 butts against the flange 14 of the draw bar which prevents relative movement in one direction and the buffing faces 19 will engage the adjacent face of the collar 38 and prevent relative movements in the other direction. The spring 32 also butts against the pin 18 as a matter of convenience largely and therefore the spring 41 is made of sufficient strength to overcome any chance of the spring 32 moving the pin 18 out of the grooves 40 in the sleeve 38.

It will be evident with the resilient anchorage 3 fixed to a car and the draw bar 2 non-rotatable relative thereto, that if sufficient effort is exerted on the head 1 to rotate the same that when the tension of the spring 41 is overcome the pin 18 will ride out of the groove 40 permitting the head 1 to rotate relative to the draw bar 2. Under normal conditions and when the head 1 is not coupled to its companion coupler, the pin 18 will be seated in the V groove 40 and held there by the spring 41.

In Figs. 6 and 7 are shown sections of the female head 1. The construction of the resilient anchorage 3 is the same as that of the anchorage 3 as just described in connection with the male coupler and a repeated description is believed unnecessary as the parts are numbered the same for both anchorages. In the descriptions and drawings of the female head, I have used the same numbers to designate the like parts in the male coupler whenever the construction and function are the same.

The female head 42 is provided with an opening 43 arranged to receive the projection 9 on the male head and to hold the same substantially without transverse or rotational movement relative to each other. Pivotly mounted on the head 42 is the lock 12 held in the locked position by the spring 44 and opened manually by means of the handle 45. It will be apparent that when the two heads are brought together, the lock 12 will be automatically moved out of its locking position and will drop back into the slot 10 on the male heads when the heads are in coupled relation thus holding the heads against uncoupling.

Projecting rearwardly from head 42 is the draw bar 5 which is provided with the buffing faces 21 as in the case of the male head just described and which will engage with the front plate 23 of the anchorage if the head is swung too far from normal. The head 42 is provided with a flange 45' which butts against the face 8 of the male head when the two heads are brought together. The coupler is provided with a centering device of the same principle and largely of the same construction as previously described and comprises a spring 32 which butts against the through rivets 46 and which at the other end is provided with a pivot plate 33. The spring 32 and plate 33 are mounted within the draw bar which has a hollow circular portion 47 and rearwardly projecting spaced members 48 which fit in the space between the projecting members 25 and are held in pivotal relation thereto by means of the pin 27.

The draw bar is also provided with the centering link 34 the relation of which to the draw bar and its operation is the same as previously explained.

When two heads are brought together the impact takes place between the face 8 and 45' and this impact is transmitted to the resilient cushions 28.

After couplers are coupled and in haulage operation all further surges are taken up by the front and back resilient cushions.

When it is desired to rotate or dump one car relative to its adjacent coupled car, it is only necessary to place such car upon the tipple and rotate the tipple and the force exerted will overcome the tension of the spring 41 of the male coupler and permit the sides of the grooves 40 to force the pin 18 out of the grooves and permit the two heads to rotate with the car and relative to the stationary car.

The front plate 23 is so constructed and related to the plate 22 that it is adjustable and movable toward or away from the plate 22 whereby the resiliency of the members 28, 29 and 30 may be controlled to a considerable extent by the bolts 37.

Modifications will suggest themselves to those skilled in the art, and therefore, I wish to be limited only by my claims.

I claim:

1. In a car coupling mechanism, in combination, a coupler comprising a head portion for coupling to a companion head and having a rearwardly projecting hollow portion, a draw bar having one end mounted in the hollow portion to rotate relative thereto and the other end provided with means to attach it to an anchorage, means to limit the forward movement of the head relative to the draw bar, a transversely disposed lock member associated with the said draw bar and movable longitudinally of the head and the drawbar and normally seated in a notch in the second said means, a spring under compression interposed between the head and the draw bar to hold the head advanced relative to the draw bar and to yieldingly hold the lock member in the notch to prevent rotation of the head relative to the draw bar under normal operation but to permit rotation of the head when a rotative force is applied to the head sufficient to overcome the force of the spring as in dumping one car relative to the coupled car at a tipple.

2. In a car coupling mechanism, in combination, a coupler head to couple to a companion head, a draw bar having one end associated with the head and means at the other end to connect the draw bar to an anchorage on a car, means preventing the longitudinal separation of the head and draw bar, a spring interposed between the head portion and draw bar portion of the coupling mechanism to yieldingly hold the head in advanced relation to the draw bar, locking means on one of the portions to engage with cooperating means on the other portion when the head and draw bar are in normal operative relation, the said spring arranged to act upon the locking means to yieldingly hold the locking means in engagement with the said cooperating means whereby the head and draw bar are held in normal relation when uncoupled and may be rotated relative to each other when a rotative force is applied to one of the portions sufficient to overcome the spring force and disengage the cooperating means.

3. In a car coupler, the combination of a head portion to couple to a companion head, a draw bar portion having means to connect to an anchorage, the said portions being rotatable relative to each other about their longitudinal axis, stop means associated with said portions preventing relative movement of the portions in one longitudinal direction, yieldably held means associated with the said portions and cooperating with means on each of the portions whereby the head portion is held in normal operative position to couple to the companion head, the yieldably held means resisting the rotation of the portions relative to each other until sufficient rotative force is applied to the portions to overcome the resistance of the yieldably held means as when one car is rotated relative to the connected car.

4. In a car coupler, the combination of a head portion to couple to a companion head, a draw bar portion having means to connect it to an anchorage, the said portions being rotatable relative to each other about their longitudinal axis, cooperating means associated with each said portions preventing relative movement of the portions in one longitudinal direction, spring held means associated with the said portions and interlocking with means on the said portions to yieldingly hold the portions in normal operative position whereby the head portion may couple to the companion head and to yieldingly resist the portions rotating relative to each other until sufficient rotative force is applied to the portions to overcome the resistance of the spring held interlocking means as when one car is rotated relative to the connected car, an anchorage to connect the portions to a car and means interposed between the draw bar and anchorage to automatically hold the coupler in central position when uncoupled and return the coupler to its central position from a non-central position.

5. In a car coupling mechanism adapted to be mounted on a car, in combination, a head portion to couple to a companion head mounted on a coupled car, a draw bar portion having means at one end associated with the head portion to support the head portion, the said portions being separately formed with stop means on one portion cooperating with stop means on the other portion preventing substantial longitudinal relative movement in both directions, an anchorage attached to the other end of the draw bar and longitudinally movable spring held means associated with said portions and cooperating with means associated with each of the said portions to hold the portions against relative rotation under normal haulage conditions but permitting relative rotation of the said portions under rollover conditions of one car relative to another.

6. In a car coupling mechanism, in combination, a head portion to couple to a companion head, a draw bar portion having means at the one end to support the head portion, the said portions separately formed with means on one portion cooperating with means on the other portion to prevent longitudinal relative movement in a direction to separate the portions under a pulling force, an anchorage adapted to be attached to a car, latching means associated with and rotatable with one of said portions and cooperating with means associated with the said other portion to hold the portions against rotation under normal haulage conditions but yieldingly resisting relative rotation of said portions under roll-over conditions of one car relative to another, a spring yieldingly holding said latching means in operative relation with the last said means and spring held means associated with the draw bar portion and cooperating with the anchorage to move the said portions laterally when free to their central position from a lateral off-center position.

7. In a haulage system, in combination, a pair of cars movable along a track and provided with cooperating coupler heads, one head mounted on its car in non-rotatable relation thereto, the other head provided with a separately formed draw bar to secure it to its car, the said draw bar being non-rotatable relative to the car but rotatable relative to its head and means interposed between the draw bar and its head and cooperating with means on the head and with means on the draw bar whereby the head is releasably held in position to automatically make a coupling with the cooperating head during normal haulage operations but will not prevent one car to be rolled over relative to the other car about their longitudinal axes while the heads are coupled to each other and means yieldably holding the interposed means in cooperative relation with said means on the draw bar.

8. In a car coupler, the combination of a head portion to couple to a companion head, a draw bar portion having means to connect to an anchorage, said portions being rotatable relative to each other, spring controlled means on one portion arranged to interlock with means on the other portion whereby the portions are held against relative rotation until a stress applied to the portions tending to rotate them relative to each other is sufficient to overcome the spring controlled means and effect a release of the interlock and permit relative rotation of the portions.

ERNST A. LARSSON.